Nov. 27, 1951             G. R. RUSSUM             2,576,698
METAL SHEATHED INSULATING BLANKET AND METHOD OF MANUFACTURE
Filed April 14, 1948
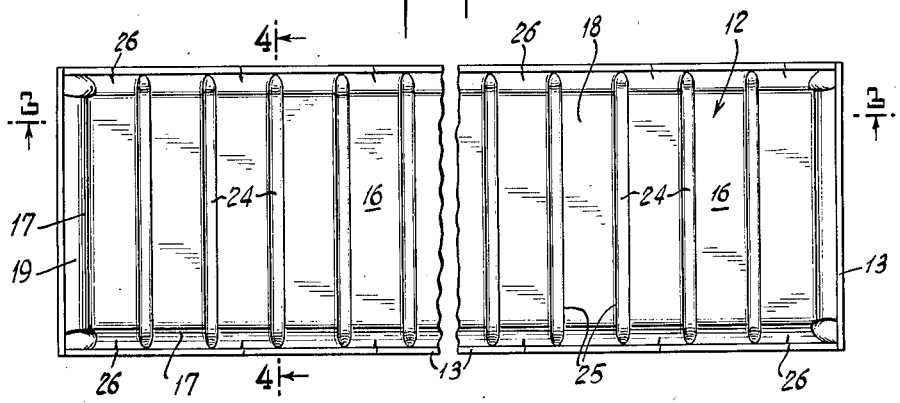
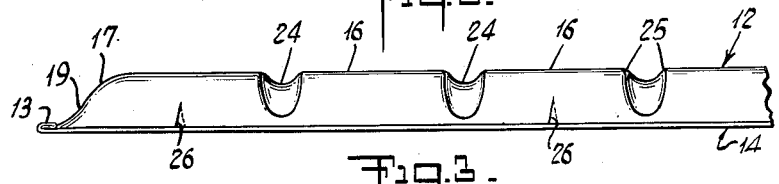
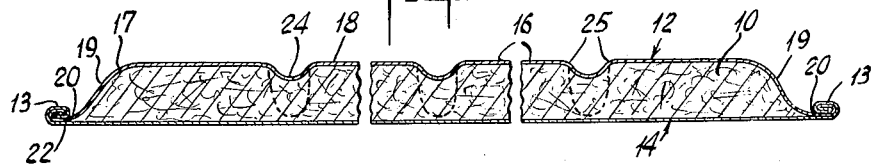
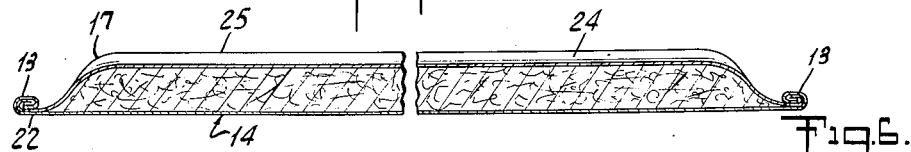
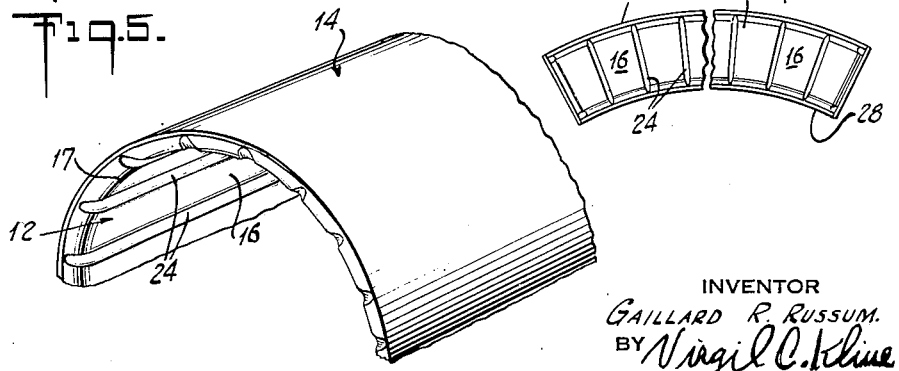
INVENTOR
GAILLARD R. RUSSUM.
BY
ATTORNEY Patented Nov. 27, 1951

2,576,698

UNITED STATES PATENT OFFICE 2,576,698

METAL-SHEATHED INSULATING BLANKET
AND METHOD OF MANUFACTURE

Gaillard R. Russum, Somerville, N. J., assignor
to Johns-Manville Corporation, New York,
N. Y., a corporation of New York Application April 14, 1948, Serial No. 21,075

11 Claims. (Cl. 154—28)

This invention relates to heat insulation, and is particularly concerned with a sheet metal sheathed flexible insulation blanket adapted for insulating engine cylinders and the like, and a method of making such blanket.

The problem of providing efficient easily handleable heat insulating blankets for covering cylindrical or frusto-conical wall surfaces of high temperature combustion units presents certain difficulties, particularly with respect to preservation of the heat insulation properties of the blankets against deterioration by contact with moisture, oil or corrosive gases and by distortional strains and ruptures. The choice is rather limited of metal sheet or foil stocks having adequate flexibility and deterioration resistance at both normal and high temperatures, for use in sheathing the present insulation blankets. Certain nickel base alloys containing chromium, copper or molybdenum, including some stainless steels, Monel metal and Inconel, have some flexibility and adaptability for such high temperature service in sheets of approximately .002 inch thickness. Sheet aluminum is flexible even in sheets of substantial thickness, i. e. about .005 inch, but is not adapted for service at very high temperatures. One difficulty encountered in using thin flat sheets of such high temperature alloy metals as Inconel for sheathing insulation blankets, is that sheathing of conventional form made therewith tends to warp and develop wrinkles and wrinkle ruptures when blankets sheathed therewith are flexed during application to or removal from curved surfaces.

A primary object of the present invention is to provide a sheet metal sheathed heat insulation blanket which is sealed against moisture penetration and which has adequate structural flexibility combined with strength and high temperature service stability to adapt it for covering the curved walls of jet engines and similar high temperature combustion units.

A particular object is to provide a sheet metal sheathing element for fiber blanket insulation having an integral hinge construction adapting it for flat sheet assembly, for high temperature service, and for repeated application to and removal from curved engine walls without impairment of the element or the blanket.

The metal-sheathed heat insulating blankets of the present invention are adapted for assembly and shipment as flat sheets, and are shaped and dimensioned for fitting cylindrical, frusto-conical or other curved surfaces. To adapt a blanket for manufacture and shipment as a flat sheet, the metal sheath is preferably assembled from two or more segments each of which is provided with border flanges having dimensions which match for joining with another segment to form a sealed joint. Since the sheathed insulating blanket includes a core of substantial thickness, as for example a fibrous batt of 1 inch thickness, adaptation of the blanket as a covering for a cylindrical or frusto-conical surface must take into account that the peripheral length of the inner face of the blanket in its curved insulating position, is considerably shorter than the length of the outer surface covering of the blanket. The present invention contemplates a multi-segment metal jacket or sheath in which the segment or segments which form the inner face for the curved insulating member, have integral shallow grooves extending across the face transversely to the direction of curvature, said grooves being spaced and serving as hinges which permit the inner face to conform to the curvature of the article to be insulated and to contract or expand in length without warping or developing wrinkles or wrinkle cracks.

With the above and other objects and features in view the invention consists in the improved heat insulating element and method of manufacture which are hereinafter described and more particularly defined in the accompanying claims.

In the following description reference will be made to the attached drawings, in which:

Fig. 1 is a broken plan view of an insulation blanket embodying the principle of the present invention, in a form adapted for covering high temperature surfaces of uniform curvature;

Fig. 2 is an enlarged broken vertical elevation of one end of the blanket portrayed in Fig. 1;

Fig. 3 is an enlarged broken longitudinal section of the metal jacketed insulation blanket, taken on the plane 3—3 of Fig. 1;

Fig. 4 is an enlarged transverse sectional view taken on the plane 4—4 of Fig. 1;

Fig. 5 is a perspective view illustrating the shaping of the blanket to cover a cylindrical surface; and Fig. 6 is a broken plan view of part of a blanket shaped for application to a cone frustum.

As portrayed in the drawings, a flexible heat insulating blanket in accordance with the present invention comprises essentially a low density porous insulation core or filling 10 (Fig. 3), and a moisture excluding and shape sustaining sheet metal jacket or sheath 12 completely enveloping the core 10 and dimensioned to approximate the dimensions of the core. The core 10 may comprise a batt of mineral fibers (asbestos or mineral wool) lightly bonded with a heat resistant binder.

In the preferred design the metal sheath 12 is made up from two segments of high temperature alloy sheet stock such as Inconel which are assembled with a lapped folded border flange joint 13 to form the unit portrayed in the drawings. That segment of the assembled blanket which forms the outside surface of the shaped cylindrical form portrayed in Fig. 5, is shown in the other views as comprising a flat sheet 14. The other segment of the assembled unit, which forms the inner surface of the cylindrical form portrayed in Fig. 5, appears in the other views as an originally somewhat wider and longer strip than sheet 14 which is shaped to the form of a shallow pan or tray 16, with gently curved shoulders 17 joining the base 18 of the tray with shalloy side walls 19. The tray 16 is dimensioned to approximately match the dimensions of the insulating core 10, with a depth which approximately corresponds with the thickness of the core 10.

The peripheral borders of the tray-shaped segment 16 comprise flanges 20 which are connected by curved shoulders with the side walls 19 and which lie in a plane paralleling the base 18 and are dimensioned to match with and lie flat against corresponding bordering edges 22 of sheet 14. In the assembled unit (Figs. 3 and 4) the peripheral borders of the sheet metal segments 14 and 16 are placed in abutting parallel relation, with the core 10 placed between them, and a water sealed joint 13 is formed by double folding and crimping these border edges together.

The tray-shaped segment 16 is designed to form the inner lining of the metal sheathed insulation blanket as it is applied to a cylindrical or other curved surface. As thus applied (Fig. 5) the radius of curvature of the inner lining 16 is shorter than the radius of curvature of the outer face 14 by an amount which corresponds with the thickness of the blanket. This means that the base of tray 16 must contract in length by as much as 1 inch per foot of length while being shaped to fit a curved surface. To permit of this substantial contraction in length of the base of segment 16, without any contraction in the length of the segment 14, when the blanket is applied to a curved surface, and to allow for application of the blanket to curved surfaces without warping or developing deep wrinkles and cracks or rupture tears in the pan segment 16, the pan segment is shown as embodying in its outer face a plurality of spaced integral shallow corrugation grooves 24. Each groove extends transversely to the direction of curvature of the assembled unit across the full width of the tray base 18 and around the curved shoulders 17 to terminate in the tray side walls 19. An optimum spacing of adjacent grooves 24 for most installation is about 3 inches. Each groove is preferably shallow in comparison with its width and of rounded contour with rounded shoulders 25. These grooves provide hinges which allow for shaping of the assembled blanket to the curved surface of a cylinder or other shape as portrayed in Fig. 5 without any difficulties with warping, wrinkling or cracking of the tray-shaped member, particularly in the areas of the shoulders 17.

Since only the main central portion of the originally larger flat sheet is deformed to produce tray segment 16, and since the grooves 24 terminate in the side walls 19 and are not extended into the border flanges 20, provision must be made to shorten the border flanges to compensate for the shortening of the central portion of the sheet affected by shaping it to form a pocket for the core 10 and by the grooves 24. Such compensatory shortening of the border flanges 20 of the tray is effected by providing folded and crimped pleats 26 at spaced intervals around the peripheral borders, each pleat extending inwardly into the side wall 19 of the tray and terminating approximately at the base of a curved shoulder 17. Suitable pleats have the shape of an equilateral triangle, with a width of about ⅛ inch for the base of the pleat at the border edge, and with a length of about 1¼ inches. A suitable spacing between pleats is about 5 to 6 inches. Such border pleats serve to adjust the dimensions of the border flanges 20 of the tray 16 to those of cover segment 14 and to thereby permit of assembly of the elements with a lapped and folded border seal joint 13 which has no serious tendency to warp or deform when the sheathed jacket is applied as insulation to a cylindrical or other curved surface. A major portion of each pleat 26 disappears from view within a doubly folded border joint such as portrayed in Fig. 4.

The heat insulating blanket which is portrayed in Figs. 1–5 was designed originally for application to cylindrical surfaces or surfaces of uniform curvature. The only modification in the design which is required for covering frusto-conical surfaces is that the core and sheath segments shall be originally shaped as portrayed in Fig. 6 to conform to the plane development of the surface which is to be covered. Thus in a blanket for covering a frusto-conical surface each of the segments 10, 14 and 16 should be originally shaped and dimensioned to conform with the flat surface development of the cone. In the plane surface cone frustum development shown the shorter arc side 28 is dimensioned to match in length the smaller peripheral dimension of the cone frustum, while the outer arc side 30 matches in length the major peripheral dimension of the cone frustum. In a blanket sheath member 16 designed for insulating a frusto-conical surface, the grooves 24 do not run parallel to each other, but are laid out in spaced radial directions with respect to the center of curvature of the plane development of the cone surface.

A satisfactory procedure for shaping sheathing segment 16 to tray form and for forming the grooves 24 and rounded shoulders 17 and 25, consists in laying the flat sheet strip on a mold conforming to the final shape of the segment as it is portrayed in the drawings, and using roll members of hard rubber or the like for forming the grooves 24 and rounded shoulders following the contour of the mold form. Where it is desired to provide openings for pipe fittings or the like through the insulation blanket (not shown), such openings are provided with supporting walls by inserting short tubular eyelets or grommets. In some cases it is desirable to provide for ventilation of the core 10 as by means of a flexible metal hose attachment (not shown).

When transverse hinge grooves 24 are provided in one face of the sheathed blanket, it tends to contract on application to a cylindrical or frusto-conical surface. It will be noted that the hinge action provided by the grooves 24 lies in the plane of the circumference in which flexing distortion takes place. Thus the multiple spaced shallow grooves take care of any hinging action necessary to prevent warping or wrinkling and cracking tendencies of the inner face 18 of the blanket as it contracts in length while being fitted to a cylindrical or frusto-conical surface.

The invention which has been thus described by detailed example is not limited as to such details and it is to be understood that variations, changes and modifications are contemplated within the scope of the invention as defined by the following claims.

What I claim is:

1. In a sheet metal sealing envelope for a flexible heat insulating blanket applicable to cover a curved surface, a tray-shape segment of sheet metal having a base and bordering sidewalls and corrugation grooves in the base, each groove being shallow in comparison with the depth of the tray, said grooves forming hinges disposed in spaced substantially parallel relation and extending across the width of the tray base transversely to the direction of curvature, peripheral border flanges for the tray sidewalls, spaced pleats in the border flanges compensating the length thereof to that of the groove-shortened tray, and a sheet metal cover for the tray dimensioned and shaped for engagement with the tray flanges to form a sealed border joint for the envelope.

2. In a sheet metal sealing envelope for a flexible heat insulating blanket applicable to cover a curved surface, a tray-shape segment having a base and bordering side walls united by curved shoulders, shallow corrugation grooves in the outer surface of the tray base, said grooves extending in substantially parallel spaced relation transversely across the tray base and around the curved shoulders but terminating short of the border edges of the tray, and spaced pleats in said border edges compensating the length thereof to that of the grooved base and shoulders of the tray.

3. In a shape sustaining and moisture excluding metal envelope for a heat insulation blanket adapted to cover high temperature curved surfaces, a tray-shaped segment of sheet metal substantially conforming in length and width with the blanket, gently curved shoulders joining the base of the tray with lateral side walls thereof, and integral shallow corrugation grooves in the outer surface of the tray base extending in spaced substantially parallel relation transversely to the curved shoulders, each groove being shallow in comparison with the depth of the tray, said grooves extending around the curved shoulders into the tray side walls.

4. In a shape sustaining and moisture excluding envelope for a heat insulation blanket adapted to cover high temperature curved surfaces, a tray-shaped segment of sheet metal, gently curved shoulders joining the base of the tray with lateral side walls thereof, shallow integral corrugation grooves extending across the base of said tray in substantially spaced relation transversely to the curved shoulders, said grooves extending around the curved shoulders, peripheral border flanges for the tray side walls, and a sheet metal cover for the tray dimensioned and shaped to engage the tray flanges, the peripheral edges of the cover sheet and tray flanges being joined with lapped folded crimped seams to form a liquid sealed border joint for the envelope.

5. A heat insulating blanket having sufficient flexibility for application to a high temperature curved surface comprising, a sheet metal supporting and sealing envelope and a core of heat insulation material enclosed within said envelope, said envelope comprising a tray-shaped segment with unitary base and side walls having gently curved shoulders forming a retaining pocket for the core, and spaced corrugation grooves in the outer surface of the tray base, each groove being shallow in comparison with its width and in comparison with the core thickness, said grooves extending across the base and around the curved shoulders into the side walls transversely to the direction of blanket curvature, said grooves forming hinges whereby the insulation may be shaped to the curved surface without wrinkling and cracking of the metal envelope.

6. A flexible heat insulation blanket for covering high temperature curved surfaces comprising, a low density insulation core of suitable shape and thickness, and a sheet metal sealing envelope fully enclosing said core, said envelope including a tray-shaped segment with a base and unitary shallow side walls, and spaced corrugation grooves extending across the base of the tray, each groove being shallow in comparison with the tray depth and of rounded contour with rounder shoulders, said grooves extending at right angles to the direction of blanket curvature and forming flexible hinges permitting wrapping of the blanket around a curved surface, and said envelope including an outer sheet metal cover segment for the tray, thereby providing a shape retaining shell enclosing the insulating core.

7. A heat insulating blanket of substantial thickness adapted to cover a curved surface comprising, a low density fibrous insulation batt and a metal envelope completely enclosing said batt and protecting it against distortion and deterioration, said envelope comprising two sheet metal strips having lapped abutting edge flanges folded and crimped to form a moisture sealing joint, one of said strips being shaped in the form of a shallow tray having a length and width substantially matching the corresponding dimensions of the batt, said tray-shaped sheet having gently rounded shoulders joining its base with its side walls and having shallow corrugation grooves formed in its outer surface, each end of each groove extending around a bordering shoulder and into the adjacent side wall, said grooves extending transversely of the sheet in substantially parallel spaced relation to form hinges adapting the grooved surface for curvature about the surface to be insulated.

8. In forming a metal envelope for covering a flexible heat insulation blanket the steps comprising, shaping a strip of sheet metal in the form of a tray having a flat base and upstanding side walls united by bordering curved shoulders, forming spaced shallow corrugation grooves in the outer surface of the tray base extending transversely across the full width thereof, extending said grooves around the bordering shoulders and into the side walls of the tray, and forming spaced pleats in the border edges of the tray to adjust the length thereof to that of the grooved base and shoulders of the tray.

9. In forming a metal envelope for covering a flexible heat insulation blanket the steps comprising, forming spaced shallow corrugation grooves of rounded contour with rounded shoulders in one face of a strip of sheet metal, said grooves extending in substantially parallel relation transversely across a major portion of the width of the strip but terminating short of the lateral edges thereof, and forming spaced pleats in said lateral edges to compensate the length thereof to that of the grooved portion of the strip.

10. The method of forming a flexible envelope for encasing a heat insulation blanket which comprises, providing two flat strips of heat resistant sheet metal, both strips being shaped and dimensioned to a plane development of a surface to be covered, shaping one strip into a tray with a base and unitary shallow peripheral sides joined by gently curved bordering shoulders, forming spaced corrugation grooves in the outer surface of the tray base extending transversely throughout the full width thereof, each groove having a depth which is shallow in comparison with its width and in comparison with the tray depth and extending around the bordering shoulders into the side walls of the tray, applying the grooved tray-shaped strip to one face of the blanket core, applying the other strip to the opposite face of the core, and forming lapped folded crimped seams around abutting edges of both strips to form a sealed joint bordering the finished insulating unit.

11. The method of forming a flat, completely metal jacketed insulation blanket suitable for application to curved surfaces which comprises, providing two sheets of high temperature resistant metal of unequal size, both shaped and dimensioned to a plane surface development of the surface to be covered, shaping the larger strip to the form of a shallow tray with a base and unitary shallow peripheral sides joined by gently curved shoulders, said tray being dimensioned as a container of a low density insulation core, forming spaced corrugation grooves in the outer surface of the tray base extending transversely across the full width thereof, said grooves extending around the gently curved shoulders and into the side walls of the tray, applying the smaller sheet metal strip as a cover to the tray after insertion of the core therein, and joining abutting edge flanges of the tray-shape sheet and cover sheet to form a liquid sealed envelope.

GAILLARD R. RUSSUM.

REFERENCES CITED

The following references are of record in the file of this patent:

UNITED STATES PATENTS

| Number | Name | Date |
|---|---|---|
| 347,631 | Merriam | Aug. 17, 1886 |
| 348,187 | Burns | Aug. 31, 1886 |
| 1,626,655 | Woodson | May 3, 1927 |
| 1,859,906 | Simpson | May 24, 1932 |
| 2,147,058 | Randall et al. | Feb. 14, 1939 |
| 2,344,575 | Warren | Mar. 21, 1944 |
| 2,475,112 | Stanitz | July 5, 1949 |

FOREIGN PATENTS

| Number | Country | Date |
|---|---|---|
| 545,890 | Great Britain | June 17, 1942 |